(12) United States Patent
Yoshida (10) Patent No.: US 6,381,074 B2
(45) Date of Patent: Apr. 30, 2002

(54) LIGHT COLLECTING OPTICAL SYSTEM

(75) Inventor: Takehiro Yoshida, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/729,078

(22) Filed: Dec. 5, 2000

(30) Foreign Application Priority Data

Dec. 6, 1999 (JP) .......................................... 11-345678

(51) Int. Cl.[7] ........................ G02B 21/02; G02B 13/00; G02B 17/00
(52) U.S. Cl. ........................ 359/661; 359/724; 359/726; 359/728; 359/737; 359/799; 359/364; 359/385
(58) Field of Search ................................. 359/290–292, 359/300, 364, 385, 656, 661, 724, 726, 728, 737, 799, 846, 847, 849, 853, 862, 863

(56) References Cited

U.S. PATENT DOCUMENTS

| | | | | |
|---|---|---|---|---|
| 4,989,957 A | * | 2/1991 | Suzuki | 359/656 |
| 5,117,433 A | * | 5/1992 | Tatsuno et al. | 359/328 |
| 5,706,137 A | * | 1/1998 | Kelly | 359/364 |
| 5,734,498 A | * | 3/1998 | Krasieva et al. | 359/368 |
| 6,248,988 B1 | * | 6/2001 | Krantz | 250/201.3 |

FOREIGN PATENT DOCUMENTS

JP        11-101942        4/1999

* cited by examiner

Primary Examiner—Georgia Epps
Assistant Examiner—Evelyn A. Lester
(74) Attorney, Agent, or Firm—Pillsbury Winthrop LLP

(57) ABSTRACT

A light collecting optical system wherein the position where light is collected is scanned in the optical axis direction by using a wavefront converting element capable of changing power without using a mechanical device, and aberration occurring during the scanning is canceled by using the wavefront converting element to minimize the degradation of light collecting performance due to the scanning in the optical axis direction. In a laser beam collecting optical system having an optical system for collimating a laser beam emitted from a laser light source and an objective for collecting the laser beam on a specimen, when the position where the laser beam is collected is changed in the optical axis direction in such a manner that the relative distance between the objective and the specimen does not change, a wavefront shape formed in an area covering at least 90% of the laser beam at or near the pupil position of the objective is changed by a wavefront converting element placed at or near a position conjugate to the objective pupil position so that predetermined conditions are satisfied.

5 Claims, 4 Drawing Sheets

LIGHT COLLECTING OPTICAL SYSTEM

This application claims benefit of Japanese Application No. Hei 11-345678 filed in Japan on Dec. 6, 1999, the contents of which are incorporated by this reference.

BACKGROUND OF THE INVENTION

The present invention relates to light collecting optical systems and, more particularly, to a laser beam collecting optical system using a wavefront converting element capable of arbitrarily changing the wavefront shape.

It has heretofore been necessary in order to obtain a three-dimensional image of a specimen in a laser scanning microscope, for example, to capture optical images of successive planes inside the specimen by mechanically moving either the specimen or the objective in the direction of the optical axis. With this method, however, it is difficult to realize accurate scanning in the optical axis direction in terms of position control errors, reproducibility, etc. because the specimen or the objective is mechanically moved. In a case where the specimen is scanned, high-speed scanning cannot be performed when the specimen is large in size. Furthermore, in a case where the objective is immersed directly in a biological specimen or a culture solution to observe the high-speed movement of living organisms, if the objective is scanned, adverse effects such as vibrations are exerted upon the specimen to be observed.

As an optical apparatus provided with an optical element capable of changing power to solve the above-described problems, Japanese Patent Application Unexamined Publication (KOKAI) No. Hei 11-101942 discloses an adaptive optical apparatus for use in a microscope. In this prior art, a wavefront modulator is inserted in either or both of an observation optical path and an illumination optical path. The focal length of the optical system is changed by using the wavefront modulator, and aberration due to the change of the focal length is also absorbed by controlling the amount of wavefront modulation as a function of the pupil radius. By doing so, it is possible not only to form and move a focal point in the object space without changing the distance between the objective and the specimen but also to correct aberration.

If the focal point is moved in the object space without changing the distance between the objective and the specimen, spherical aberration occurs owing to the movement of the focal point. The prior art does not specifically state how the wavefront is to be converted by the wavefront converting element to correct the aberration.

SUMMARY OF THE INVENTION

The present invention was made to solve the above-described problems associated with the prior art. Objects of the present invention are as follows. A first object of the present invention is to scan the position where a light beam is collected along the optical axis direction in a light collecting optical system by using a wavefront converting element capable of optically changing power without using a mechanical device, and to cancel aberration occurring during the scanning by using the wavefront converting element to thereby minimize the degradation of light collecting performance due to the scanning along the optical axis direction. A second object of the present invention is to express the properties of a wavefront shape produced by the wavefront converting element. A third object of the present invention is to clarify the mechanism as to how the wavefront shape converted by the wavefront converting element changes according to the position where light is collected in the optical axis direction of the objective.

To attain the above-described objects, the present invention provides a light collecting optical system having a light source and an objective for collecting light from the light source. The light collecting optical system further has a wavefront converting element placed at or near a position conjugate to the pupil position of the objective.

The wavefront converting element changes a wavefront shape formed in an area covering at least 90% of a light beam at or near the pupil position according to the following conditions 1 to 4.

When the position where the light from the light source is collected by the objective is away from the objective, the wavefront converting element changes the wavefront shape according to the following conditions 1 and 2.

Condition 1: the amount of change of the wavefront shape decreases monotonously from the center toward the periphery of the pupil.

Condition 2: the wavefront shape is convex toward the objective.

When the position where the light from the light source is collected by the objective is closer to the objective, the wavefront converting element changes the wavefront shape according to the following conditions 3 and 4.

Condition 3: the amount of change of the wavefront shape increases monotonously from the center toward the periphery of the pupil.

Condition 4: the wavefront shape is concave toward the objective.

Thus, even when the position where light is collected is changed along the optical axis direction in such a manner that the relative distance between the objective and the specimen does not change, spherical aberration occurring owing to the change of the position where light is collected can be minimized.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
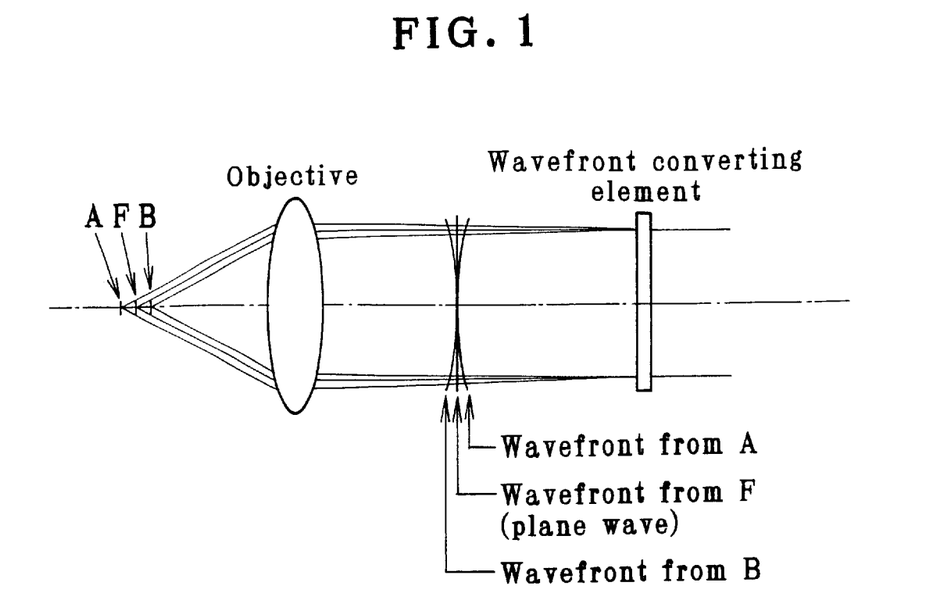
FIG. 1 is a diagram for describing the wavefront shapes of light beams from respective points shifted forward and backward of the focal position of an objective.

Here, let us explain a wavefront shape corresponding to aberration (spherical aberration) occurring as a result of the scanning along the optical axis direction with reference to FIG. 1. When the point of collected light on the optical axis of an aplanatic lens is moved, the wavefront is deformed in symmetry with respect to the optical axis, and the amount of deformation of the wavefront increases acceleratedly as the distance from the optical axis increases toward the periphery of the pupil. Therefore, the amount of wavefront conversion required to cancel the deformation and to thereby restore the deformed wavefront to a plane wave needs to be increased acceleratedly as the distance from the optical axis increases toward the periphery of the pupil. In FIG. 1, light rays are traced in the reverse direction (backward ray tracing) to the actual travel direction of rays with a view to facilitating understanding. A light beam from a focal position F of an objective emerges from the objective in the form of a non-aberrated parallel light beam, that is, a plane wave in terms of the condition of the wavefront. A light beam from point A shifted in the positive direction emerges from the objective in the form of a convergent light beam. At the pupil plane of the objective, the wavefront is deformed by the effect of aberration occurring as a result of the shift of the position where light is collected such that as the distance from the optical axis increases toward the periphery of the pupil (i.e. the light flux), the curvature of the wavefront becomes larger, and thus the slope of the wavefront shape curve increases. At this time, the wavefront has a shape satisfying the conditions 1 and 2. It should be noted that the phrase "decreases monotonously" in the condition 1 expresses the condition of 'the wavefront from A' with respect to 'the wavefront from F' in FIG. 1. With respect to the shape (plane) of 'the wavefront from F', the shape of 'the wavefront from A' is curved in such a manner as to come away from the plane toward the light source (in the negative direction) as the distance from the optical axis increases toward the periphery of the pupil. Therefore, this is expressed as being "decreases". Furthermore, the term "convex" means that the wavefront is convex toward the objective. After passing through the pupil plane, the wavefront is restored to the plane wave by the wavefront converting element. When light rays are traced in the reverse direction to the above, that is, from the light source side, a plane wave incident on the wavefront converting element is deformed by the wavefront converting element, so that at the pupil plane of the objective, the wavefront has a shape satisfying the conditions 1 and 2. Thereafter, the light beam is collected at point A by the objective. Accordingly, the wavefront deformed by the wavefront converting element so as to satisfy the conditions 1 and 2 at the pupil of the objective is collected at point A, that is, at a position more away from the objective than point F, in a state where the aberration is minimized.

Conversely, a light beam from point B shifted in the negative direction emerges from the objective in the form of a divergent light beam. At the pupil plane of the objective, the wavefront is deformed by the effect of aberration occurring as a result of the shift of the position where light is collected such that as the distance from the optical axis increases toward the periphery of the pupil (i.e. the light flux), the curvature of the wavefront becomes larger, and thus the slope of the wavefront shape curve increases. At this time, the wavefront has a shape satisfying the conditions 3 and 4. It should be noted that the phrase "increases monotonously" in the condition 3 expresses the condition of 'the wavefront from B' with respect to 'the wavefront from F' in FIG. 1. With respect to the shape (plane) of 'the wavefront from F', the shape of 'the wavefront from B' is curved in such a manner as to come away from the plane toward the objective (in the positive direction) as the distance from the optical axis increases toward the periphery of the pupil. Therefore, this is expressed as being "increases". After passing through the pupil plane, the wavefront is restored to the plane wave by the wavefront converting element. When light rays are traced in the reverse direction to the above, that is, from the light source side, a plane wave incident on the wavefront converting element is deformed by the wavefront converting element so that at the pupil plane of the objective, the wavefront has a shape satisfying the conditions 3 and 4. Thereafter, the light beam is collected at point B by the objective. Accordingly, the wavefront deformed by the wavefront converting element so as to satisfy the conditions 3 and 4 at the pupil of the objective is collected at point B, that is, at a position closer to the objective than point F, in a state where the aberration is minimized. It should be noted that the same results are obtained even when the wavefront converting element is placed at or near the pupil position of the objective.

It should be noted that light rays are not incident on the whole area of the pupil of the objective in the case of modified illumination such as annular zone illumination. In the present invention, however, consideration is given to only an area covering 90% of an area on which light rays are incident, and it is specified that the conditions 1 and 2 or the conditions 3 and 4 shall be satisfied in an area covering 90% of the light beam at or near the pupil position. When an intervening optical system or the wavefront converting element itself has dust particles thereon or carries flaws, the wavefront may change sharply at the pupil position of the objective. In a case where the wavefront converting element is divided into a plurality of areas and the boundary lines between the areas are projected on the pupil plane of the objective, the wavefront may also become discontinuous or change sharply. For such portions where the wavefront shape changes sharply or becomes discontinuous, the wavefront shape need not satisfy the conditions 1 and 2 or the conditions 3 and 4. In a case where the surface accuracy of a lens and an optical element that constitutes an optical system or/and the wavefront converting element itself is at such a level that the optical performance is not degraded to 0.7 or less in terms of the Strehl ratio of wavefront aberration of the collected light spot, extremely small amplitude undulation may appear in the wavefront shape formed by the optical system. In such a case, the wavefront shape fails to show a monotonous increase or decrease in the amount of deformation in the strict sense. However, a wavefront shape variation of extremely small amplitude due to such a cause does not constitute a principal factor in the description of the feature of the optical system. Therefore, the extremely small amplitude undulation shall be included in the monotonous decrease stated in the condition 1 or in the monotonous increase in the condition 3.

Furthermore, it is preferable in the light collecting optical system according to the present invention that the wavefront shape g(x, y, z, na) at or near the pupil position of the objective should satisfy the following Condition 1a or 1b.

When $g_1(x, y, z, na) = g_0(x, y, 10\delta, na)z/10\delta$, for (x, y) that satisfies $x^2+y^2 \geq 0.3$ and z that satisfies $3\delta < z < 50\delta$, $$1.2g_1(x, y, z, na) < g(x, y, z, na) < 0.8g_1(x, y, z, na) \quad \text{(Condition 1a)}$$

For $(x, y)$ that satisfies $x^2+y^2 \geq 0.3$ and $z$ that satisfies $-50\delta < z < -3\delta$, $$0.8g_1(x, y, z, na) < g(x, y, z, na) < 1.2g_1(x, y, z, na) \quad \text{(Condition 1b)}$$

In the above Conditions 1a and 1b:

$g(x, y, z, na)$: a wavefront shape (units: wavelength) formed at the pupil plane of the objective by the wavefront converting element, wherein $g(0, 0, z, na) \equiv 0$;

$g_0(x, y, z, na)$: a wavefront shape (units: wavelength) formed at the pupil plane of the objective by light from a point light source at a position z on the optical axis after passing through the objective, wherein $g_0(0, 0, z, na) \equiv 0$;

$x, y$: a position in the pupil plane of the objective, wherein a position on the optical axis is expressed by $(x, y)=(0, 0)$, and $x^2+y^2 \leq 1$ holds because normalization is performed by using the pupil radius of the objective;

z: a position on the optical axis, wherein the position where wavefront aberration becomes minimum is $z=0$ with regard to a collected light spot formed on the specimen side of the objective used when a plane wave enters the objective from the image side thereof, and the direction in which light travels from the light source toward the specimen is defined as a positive direction;

na: $(=NA/n)$ a value obtained by dividing the specimen-side numerical aperture of the objective by the refractive index n of the medium between the objective and the specimen $(0.1<na<0.95)$.

In addition, the pupil position of the objective is the back focal position when the specimen side is defined as the front side.

Further, in the above Conditions 1a and 1b, $$\delta = n\lambda/2NA^2$$

where:
δ: the depth of focus;
n: the refractive index of the medium between the objective and the specimen;
λ: the working wavelength;
NA: the specimen-side numerical aperture of the objective.

By controlling the wavefront converting element in this way, it is possible to minimize spherical aberration occurring when the position where light is collected is changed along the optical axis direction over a wide range in such a manner that the relative distance between the objective and the specimen does not change.

Figure 2:
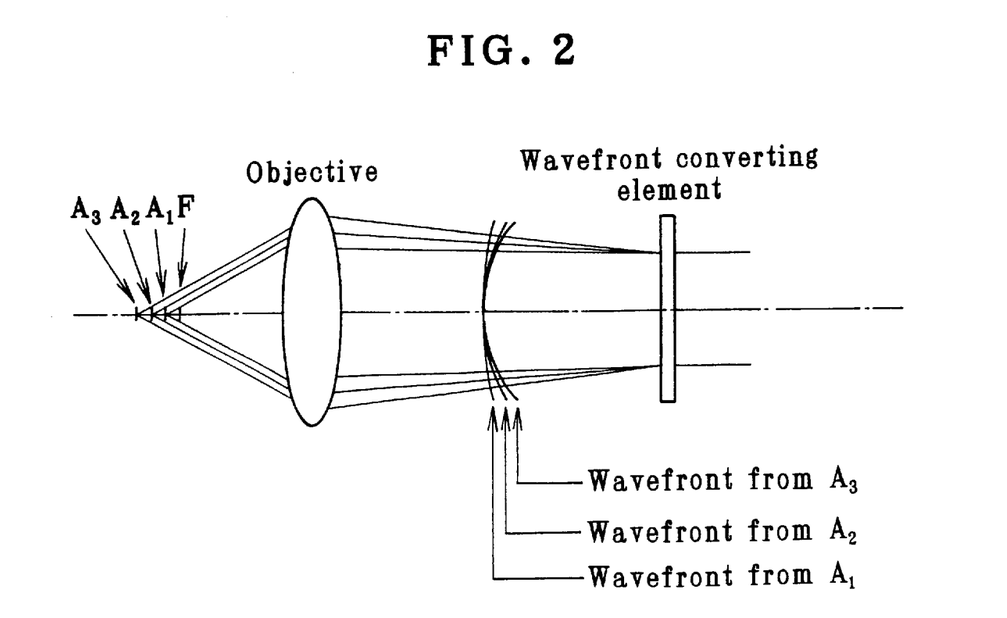
FIG. 2 is a diagram for describing wavefront shapes formed at the pupil position of an objective by light rays from a point light source as placed at positions $A_1$, $A_2$ and $A_3$, respectively.

Here, let us explain the relationship between aberration (spherical aberration) occurring at each point other than the focal position when the position where light is collected is changed along the optical axis and the wavefront shape corresponding to the aberration with reference to FIG. 2. FIG. 2 shows the shape of each wavefront formed at the pupil position of the objective when light from each of point light sources placed at positions $A_1$, $A_2$ and $A_3$ passes through the objective.

When the objective is aplanatic, the amount of deviation of the wavefront shape from a plane at the pupil position of the objective is proportional to the distance from the focal position F to each of the point light sources $A_1$, $A_2$ and $A_3$. However, it does not mean that the proportional relation is maintained no matter how far away the position where light is collected is from the focal position F. The proportional relation is maintained up to about 50 times the focal depth δ at the most.

Incidentally, the aplanatic objective is an objective through which light from a point light source at the focal position F becomes a perfect plane wave at the pupil position of the objective. However, it is actually difficult to realize such an objective. Most objectives have some aberration. Therefore, the wavefront may be deformed by aberration at the pupil position. In general, however, because objectives are favorably corrected for aberration, the amount of aberration produced by the objectives is small. Accordingly, the amount of deformation of the wavefront caused by aberration is small in comparison to the amount of deformation of the wavefront due to the displacement (defocus) from the focal position F. However, when the displacement from the focal position F is small, the amount of deformation of the wavefront caused by aberration is larger than the amount of deformation of the wavefront due to the displacement from the focal position F. Therefore, the proportional relation is destroyed at a shorter distance to the focal position F than a limit distance that is about 3 times the focal depth δ. Accordingly, it may be considered that the wavefront formed at the pupil position of the objective is deformed approximately in proportion to the distance between the position where light is collected and the focal position F when a point light source is placed at a position within either of $3\delta < z < 50\delta$ and $-50\delta < z < -3\delta$.

In the present invention, $g_0(x, y, 10\delta, na)$ is used as a wavefront serving as a basis of proportional relation, as described later. It should be noted that $g_0(x, y, 10\delta, na)$ is a wavefront formed by light from a point light source at a position $10\delta$ away from the focal point F. Because it is within the range of $3\delta < z < 50\delta$, $g_0(x, y, 10\delta, na)$ can be used as a wavefront serving as a basis of proportional relation.

The reason why $x^2+y^2 < 0.3$ is excluded is as follows. Within this range, the amount of deviation of the wavefront from a plane is small, so that the effect of aberration inherent in the objective becomes unignorable. Consequently, the amount of deviation of the wavefront shape and the distance from the focal position F are no longer in simple proportional relation to each other. The reason why $-3\delta \leq z \leq 3\delta$ is excluded is as follows. Within this range, the effect of aberration inherent in the objective on the wavefront shape is unignorable relative to the amount of deformation of the wavefront due to defocus, and the amount of deviation of the wavefront shape and the distance from the focal position F are no longer in simple proportional relation to each other. The reason why the ranges of $z \geq 50\delta$ and $z \leq -50\delta$ are excluded is as follows. No matter how much the objective is close to being aplanatic, the wavefront shape no longer changes linearly with respect to such a large defocus component. Consequently, the wavefront shape does not satisfy either of Conditions 1a and 1b.

Accordingly, when the wavefront converting element operates so that a wavefront shape at the pupil plane of the objective satisfies Condition 1a or 1b, a light collecting condition in which spherical aberration is minimized can be obtained within a desired range of z. It should be noted that the above-described wavefront shape at the pupil plane of the objective is a wavefront shape formed by rays reaching the pupil plane of the objective after passing through or being reflected from the wavefront converting element.

Here, let us explain the functions used in the above.

$g(x, y, z, na)$ is a wavefront shape formed at the pupil plane of the objective by the wavefront converting element, which is defined in the range of $x^2+y^2 \leq 1$. It is such a wavefront shape that the wave is collected near the position z on the optical axis after passing through the objective, and it is a function of the positions x and y in the pupil plane of the objective, the position z where light is collected and the value na of the objective (na=NA/n; a value obtained by dividing the specimen-side numerical aperture NA of an objective used by the refractive index n of the medium between the objective and the specimen). In general, when $x^2+y^2=k$ (k: a constant), g(x, y, z, na) also assumes a constant value. g(0, 0, z, na)≡0. Units are wavelength.

$g_0$(x, y, z, na) is a wavefront shape formed at the pupil plane of the objective by light from a point light source at a position z on the optical axis after passing through the objective. It is defined in the range of $x^2+y^2 \leq 1$. When $x^2+y^2=k$ (k: a constant), $g_0$(x, y, z, na) also assumes a constant value. It is a function of the positions x and y in the pupil plane of the objective, the position z where light is collected and the value na (=NA/n) of the objective. $g_0$(0, 0, z, na)≡0. Units are wavelength.

In the foregoing discussion, it is assumed that g(x, y, z, na)=$g_1$(x, y, z, na). $g_1$(x, y, z, na) is a function defined as being $g_1$(x, y, z, na)=$g_0$(x, y, 10δ, na)z/10δ. A wavefront shape formed at the pupil plane of the objective by light from a point light source at a position z=10δ on the optical axis after passing through the objective is selected as a wavefront shape serving as a basis of proportional relation, and it is multiplied by a coefficient so as to be proportional to the distance.

If g(x, y, z, na) is smaller than the lower limit value of Condition 1a or 1b with respect to certain x, y and z, the wavefront departs from the ideal shape. As a result, the point of collected light (position where wavefront aberration becomes minimum) is not present in the vicinity of the position z on the optical axis. The point of collected light shifts to a position more away from the objective. Alternatively, or in addition, wavefront aberration at the position where wavefront aberration becomes minimum assumes a large value. Consequently, it becomes impossible to obtain a favorably collected light spot. On the other hand, if g(x, y, z, na) is larger than the upper limit value of Condition 1a or 1b with respect to certain x, y and z, the wavefront departs from the ideal shape. As a result, the point of collected light (position where wavefront aberration becomes minimum) is not present in the vicinity of the position z on the optical axis. The point of collected light shifts to a position closer to the objective. Alternatively, or in addition, wavefront aberration at the position where wavefront aberration becomes minimum assumes a large value. Consequently, it becomes impossible to obtain a favorably collected light spot.

It should be noted that even when Condition 1a or 1b is satisfied, the Strehl ratio of wavefront aberration at the position where light is collected should desirably be not less than 0.7. If the Strehl ratio is 0.7 or more, the light collecting performance is not so degraded, and it is possible to scan the position where light is collected in the z-direction in a favorably collected condition.

Furthermore, it is preferable in the light collecting optical system according to the present invention that the wavefront shape g(x, y, z, na) at or near the pupil position of the objective should satisfy the following Condition 2a or 2b.

Assuming that, for $-3\delta < z < 3\delta$, $$g_1(x, y, z, na) = \{g_0(x, y, \delta, na) - g_0(x, y, 0, na)\}z/\delta + g_0(x, y, 0, na)$$

when $g_1(x, y, z, na) \geq 0$, $$0.8 g_1(x, y, z, na) < g(x, y, z, na) < 1.2 g_1(x, y, z, na) \quad \text{(Condition 2a)}$$

when $g_1(x, y, z, na) \leq 0$, $$1.2 g_1(x, y, z, na) < g(x, y, z, na) < 0.8 g_1(x, y, z, na) \quad \text{(Condition 2b)}$$

By controlling the wavefront converting element in this way, it is possible to minimize spherical aberration occurring when the position where light is collected is changed along the optical axis direction over a wide range in such a manner that the relative distance between the objective and the specimen does not change.

Let us discuss the shape of a wavefront formed at the pupil plane of the objective when a point light source is placed at a position within the range of $-3\delta < z < 3\delta$. When a point light source is moved along the optical axis of an aplanatic objective, the amount of deviation of the wavefront shape at the pupil position of the objective from a plane at each point changes in proportion to the distance $FA_n$ (n=1, 2, 3) in FIG. 2 when the numerical aperture of the objective is constant. However, this applies in a case where the objective is such an aplanatic lens that a perfect plane wave is formed at the pupil position of the objective when the position where light is collected is at F. An actual objective may have aberration left uncorrected although it is only a little. If such an objective is used, when a point light source is placed at the position F in FIG. 2, the wavefront shape $g_0$(x, y, 0, na) formed at the pupil position of the objective is not a plane wave. In this case, a wavefront shape obtained by subtracting the wavefront shape $g_0$(x, y, 0, na) from the shape of a wavefront formed at the pupil plane of the objective when a point light source is placed at point A within the range of $-3\delta < z < 3\delta$ changes according to the position of A in proportion to the distance z between F and A. $g_1$(x, y, z, na) is given by $$g_1(x, y, z, na) = \{g_0(x, y, \delta, na) - g_0(x, y, 0, na)\}z/\delta + g_0(x, y, 0, na)$$

It defines a wavefront shape formed at the pupil position of the objective when a point light source is placed at a position z on the optical axis within the range of $-3\delta < z < 3\delta$ on the basis of proportional relation.

Accordingly, when the wavefront converting element operates so that a wavefront shape at the pupil plane of the objective satisfies Condition 2a or 2b, a light collecting condition in which spherical aberration is minimized can be obtained within a desired range of z. It should be noted that the above-described wavefront shape at the pupil plane of the objective is a wavefront shape formed by rays reaching the pupil plane of the objective after passing through or being reflected from the wavefront converting element.

In the foregoing discussion, it is assumed that g(x, y, z, na)=$g_1$(x, y, z, na). If g(x, y, z, na) is smaller than the lower limit value of Condition 2a or 2b with respect to certain x, y and z, the wavefront departs from the ideal shape. As a result, the point of collected light (position where wavefront aberration becomes minimum) is not present in the vicinity of the position z on the optical axis. The point of collected light shifts to a position more away from the objective. Alternatively, or in addition, wavefront aberration at the position where wavefront aberration becomes minimum assumes a large value. Consequently, it becomes impossible to obtain a favorably collected light spot. On the other hand, if g(x, y, z, na) is larger than the upper limit value of Condition 2a or 2b with respect to certain x, y and z, the wavefront departs from the ideal shape. As a result, the point of collected light (position where wavefront aberration becomes minimum) is not present in the vicinity of the position z on the optical axis. The point of collected light shifts to a position closer to the objective. Alternatively, or in addition, wavefront aberration at the position where wavefront aberration becomes minimum assumes a large value. Consequently, it becomes impossible to obtain a favorably collected light spot.

It should be noted that even when Condition 2a or 2b is satisfied, the Strehl ratio of wavefront aberration at the position where light is collected should desirably be not less than 0.7. If the Strehl ratio is 0.7 or more, the light collecting performance is not so degraded, and it is possible to scan the position where light is collected along the z-direction in a favorably collected condition.

Assuming that the refractive index of the medium between the objective and the specimen and that of the specimen are approximately equal to each other, it is desirable that the light collecting optical system according to the present invention should operate as follows. First, when a laser beam is collected in the vicinity of the position of z=10δ in such a manner that the relative distance between the objective and the specimen does not change, the wavefront shape at the pupil position of the objective should be changed by the wavefront converting element so as to satisfy the following Condition 3. Second, the Strehl ratio of wavefront aberration of the collected light spot at the position where wavefront aberration becomes minimum should be larger than 0.7.

For all ρ in $0.3 \leq \rho \leq 0.9$, $$1.2f(\rho, na) < g(x, y, 10\delta, na) < 0.8f(\rho, na) \quad \text{(Condition 3)}$$

where $\rho = \sqrt{(x^2+y^2)}$ $(0 \leq \rho \leq 1)$.

In the above Condition 3, f(ρ, na) is a continuous and smooth function in which f(0, na)=0. When ρ=0.3, 0.5, 0.7 or 0.9, the function has a value defined by the following Equation 4, in which units are wavelength:

$$f(0.3, na) = -0.0054413na^2 - 0.0088714na - 0.22346$$

$$f(0.5, na) = -0.096784na^3 - 0.030613na^2 - 0.024739na - 0.62303$$

$$f(0.7, na) = -0.6174na^4 + 0.4737na^3 - 0.6301na^2 + 0.0274na - 1.2267$$

$$f(0.9, na) = -33.976na^5 + 70.361na^4 - 56.739na^3 + 19.379na^2 - 3.2785na - 1.8511 \quad \text{(Equation 4)}$$

The above-described operation of the wavefront converting element enables a favorably collected light spot to be formed in the vicinity of the position of z=10δ.

As has been stated above, the wavefront shape formed at the pupil position of the objective by light from a point light source at the position of z=10δ after passing through the objective is uniquely determined even when the objective is completely aplanatic. The amount of deviation of the wavefront shape from a plane depends upon a value (=na) obtained by dividing the specimen-side numerical aperture of the objective by the refractive index of the medium between the objective and the specimen and the radius in the pupil plane. When the radius ρ in the pupil plane is fixed to ρ=0.3, 0.5, 0.7 or 0.9, the amount of deviation of the wavefront shape from a plane is expressed as a function of only the value na. This function is continuous and smooth. Although it cannot be expressed by a simple equation, the function can be written as expressed by Equation 4 when it is approximated by a polynomial of appropriate degree.

When the wavefront converting element operates such that the wavefront shape at the pupil plane of the objective satisfies Condition 3 and becomes continuous and smooth, that is, when g(x, y, 10δ, na)=f(ρ, na), a light collecting condition in which spherical aberration is almost completely canceled can be obtained at the position of z=10δ. It should be noted that the above-described wavefront shape at the pupil plane of the objective is a wavefront shape formed by light rays reaching the pupil plane of the objective after passing through or being reflected from the wavefront converting element.

When the wavefront shape at the pupil plane of the objective satisfies Condition 3 but g(x, y, 10δ, na)≠f(ρ, na), the following problems will result. One of the problems is that the position where wavefront aberration of the collected light spot becomes minimum is displaced from z=10δ. Another problem is that the light collecting performance at that point is degraded. It should be noted that the above-described wavefront shape at the pupil plane of the objective is a wavefront shape formed by light rays reaching the pupil plane of the objective after passing through or being reflected from the wavefront converting element When g(x, y, 10δ, na) does not satisfy Condition 3 for ρ in $0.3 \leq \rho \leq 0.9$, the above-described effects appear markedly, so that the position z where wavefront aberration of the collected light spot becomes minimum may be out of the range of 9.5δ<z<10.5δ or the Strehl ratio of wavefront aberration at that position may become below 0.7. Therefore, it is necessary to satisfy Condition 3 in order to control an error of the position where light is collected in the optical axis direction to within the focal depth δ and to favorably correct wavefront aberration of the collected light spot.

Embodiments of the present invention will be described below more specifically by way of examples illustrated in the accompanying drawings.

EXAMPLE 1

Figure 3:
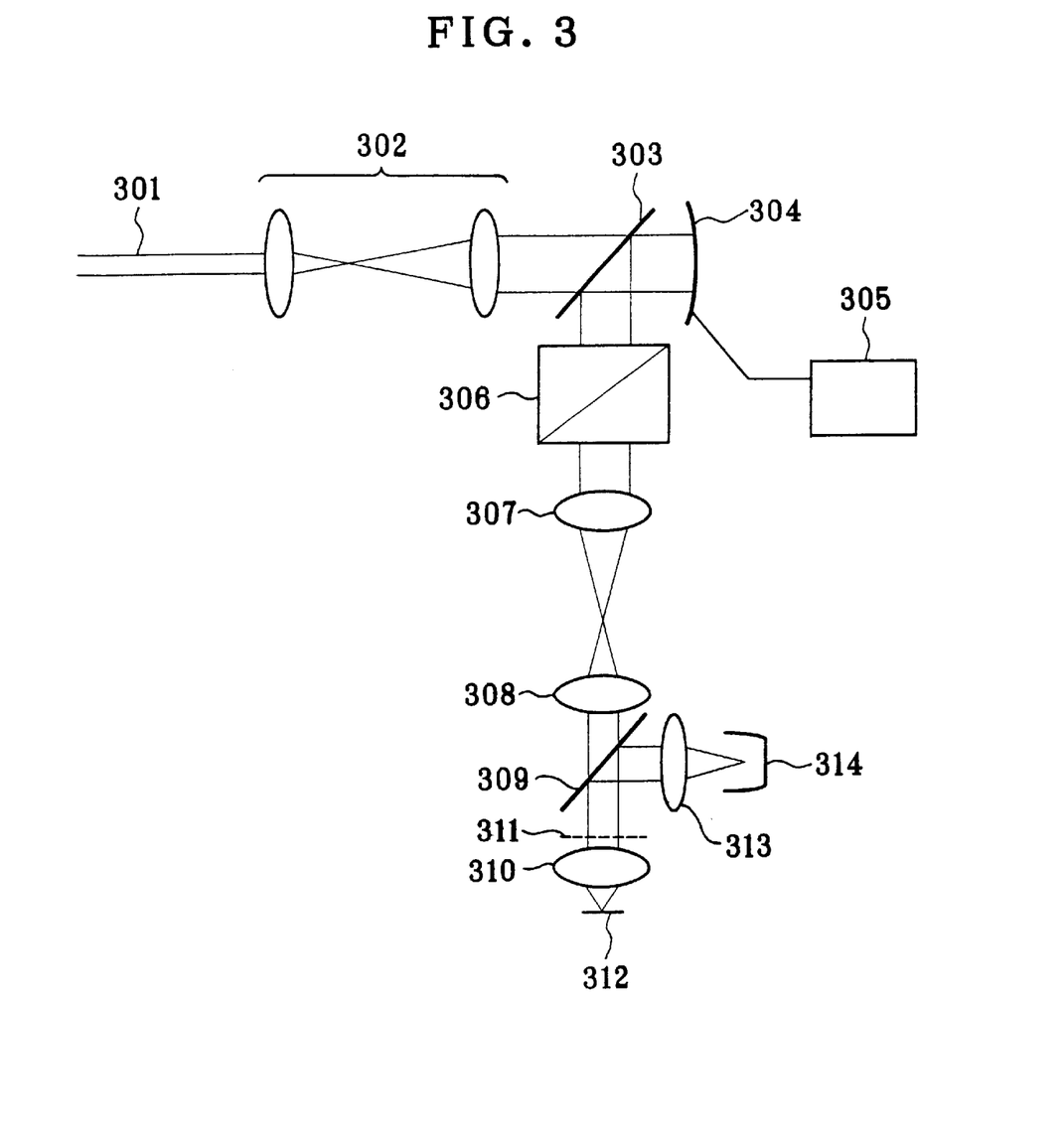
FIG. 3 is a schematic view showing the arrangement of an example in which a laser beam collecting optical system according to the present invention is used in a laser scanning microscope.

FIG. 3 is a schematize view showing the arrangement of Example 1 in which a laser beam collecting optical system according to the present invention is used in a laser scanning microscope. More specifically, in this example, the laser beam collecting optical system is applied to a beam scanning type multiphoton excitation fluorescence microscope.

A light beam 301 from a laser is collimated to a desired size by a beam expander 302. After passing through a half-mirror 303, the collimated light beam is incident on a reflection type wavefront converting element 304. After the wavefront shape has been changed by the wavefront converting element 304, the light beam is reflected by the half-mirror 303 and then scanned in x–y directions by a scanning optical system 306. The scanned light beam is collected in the vicinity of the focal position of an imaging lens 308 by a pupil projection lens 307. Then, the light beam is collected on a specimen surface 312 by a combination of the imaging lens 308 and an objective 310 through a dichroic mirror 309. On the specimen surface 312, the light beam is scanned in the x–y directions. Fluorescent light from the specimen surface 312 excited by the collected excitation beam travels along the optical path in the opposite direction to the direction of excitation beam. The fluorescent light is reflected by the dichroic mirror 309 and detected by a detector 314 through a detecting optical system 313. It should be noted that the wavefront converting element 304 and each of two galvanometer mirrors (not shown) provided in the scanning optical system 306 to scan the position 312 where light is collected in a direction perpendicular to the optical axis and further the pupil position 311 of the objective 310 are all placed in conjugate or nearly conjugate relation to each other by the intervening optical systems. That is, the scanning optical system 306 includes a pupil projection lens (not shown) for placing the wavefront converting element 304 and the galvanometer mirror (not shown) closer to the wavefront converting element 304 in conjugate relation to each other.

In this example, the wavefront converting element 304 capable of changing the wavefront into a desired shaped is formed from a deformable mirror. The configuration of the deformable mirror is controlled by a controller 305.

The deformable mirror has a plurality of divided areas each having a control element whose position is individually controllable in a direction perpendicular to the mirror surface. The upper surface of each control element is covered with a variable-shape reflecting membrane. By controlling the positions of the variable-shape membranes in the direction of the optical axis, the deformable mirror can be used as a wavefront converting element. By forming the configuration of the deformable mirror into an aspherical convex mirror or an aspherical concave mirror, it is possible to realize any desired one of the above-described wavefront shapes in the present invention at the pupil position 311 of the objective 310. Thus, it is possible to move the position where the light beam is collected in the optical axis direction and to remove aberration from the light beam at the position where the light beam is collected.

In this example, the laser beam collecting optical system is not a confocal system, which is frequently used in laser scanning microscopes. However, it does not matter because the process of fluorescence by multiphoton excitation is per se a non-linear phenomenon and it occurs only in the vicinity of the position where the excitation beam is collected.

It is assumed that the objective 310 is used in the air and the numerical aperture of the objective 310 is 0.5 on one occasion and 0.8 on another. The deformable mirror 304 and the pupil position 311 of the objective 310 are in conjugate relation to each other. Regardless of the degree of projection magnification, the amount of deformation of the deformable mirror and the amount of deformation of the wavefront at the objective pupil position 311 when a point of z=δ is viewed in an approximately aberration-free state are as shown in Table 1 and FIG. 4.

Figure 4:
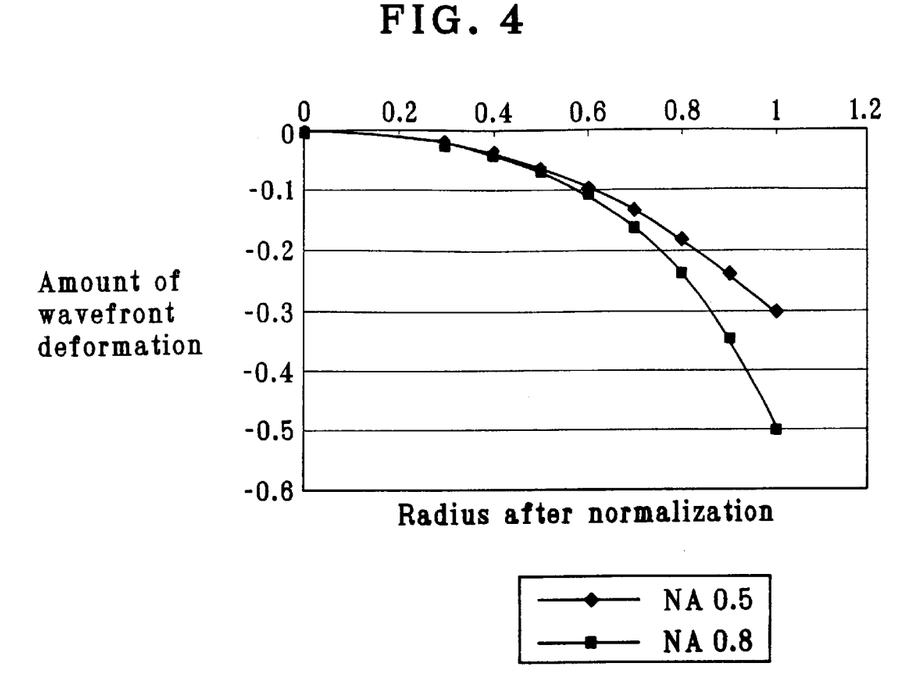
FIG. 4 is a graph showing the amount of wavefront deformation at the pupil position of an objective when a point of $z=\delta$ is viewed in an approximately aberration-free state in Example 1.

The amount of wavefront deformation satisfies the conditions 1 and 2.

Figure 5:
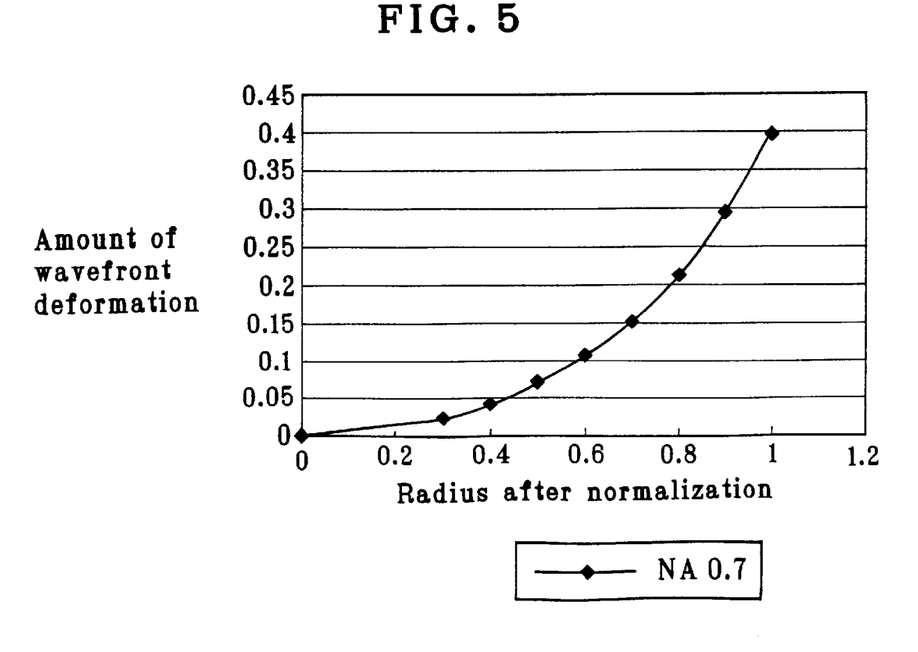
FIG. 5 is a graph showing the amount of wavefront deformation at the pupil position of an objective when a point of $z=-\delta$ is viewed in an approximately aberration-free state in Example 1.

When an objective 310 having a numerical aperture of 0.7 is used and a point of z=−δ is viewed in an approximately aberration-free state, the amount of deformation of the deformable mirror 304 and the amount of deformation of the wavefront at the objective pupil position 311 are as shown in Table 2 and FIG. 5.

TABLE 2

| | Radius after normalization | 0 | 0.3 | 0.4 | 0.5 | 0.6 | 0.7 | 0.8 | 0.9 | 0.99 |
|---|---|---|---|---|---|---|---|---|---|---|
| NA0.7 | Amount of wavefront deformation | 0 | 0.023 | 0.042 | 0.069 | 0.104 | 0.150 | 0.211 | 0.294 | 0.395 |
| | Mirror configuration | 0 | 0.019 | 0.034 | 0.055 | 0.083 | 0.119 | 0.165 | 0.223 | 0.282 |

The amount of wavefront deformation satisfies the conditions 3 and 4.

In either of the above cases, the values are those based on the wavelength and do not depend on the focal length of the objective 310.

The objective 310 used in the above calculations is not a real objective but assumed to be an aplanatic lens that collects a parallel light beam as the smallest spot in terms of wavefront optics.

Although in this example the wavefront converting element 304 is a deformable mirror, the wavefront converting element 304 is not necessarily limited thereto. The wavefront converting element 304 may also be a liquid crystal lens or a micromirror device, which are capable of freely changing power or configuration, or a combination of these devices. Regarding the structure of the deformable mirror also, it is not necessarily limited to a structure formed from a plurality of control elements. The deformable mirror has any structure, provided that the mirror surface can be deformed into an aspherical convex mirror or an aspherical concave mirror.

EXAMPLE 2

Figure 6:
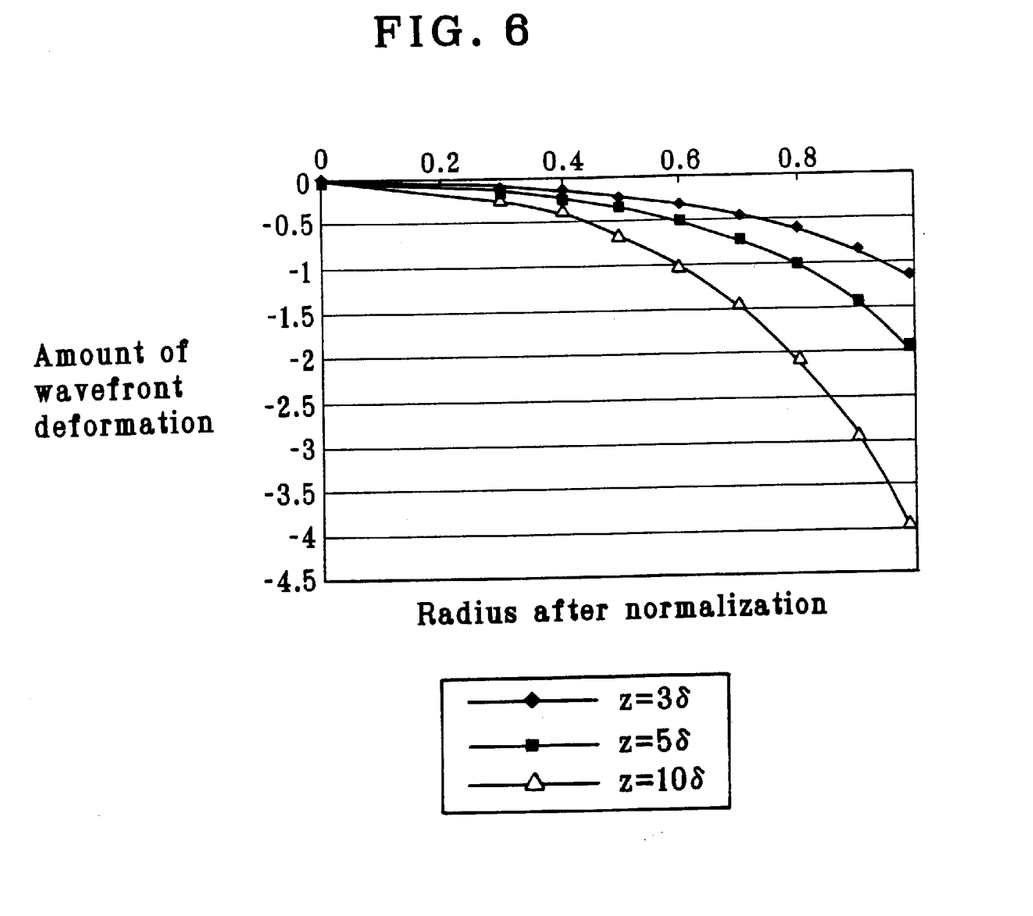
FIG. 6 is a graph showing the amount of wavefront deformation at the pupil position of an objective when points of z=3δ, 5δ and 10δ are viewed in an approximately aberration-free state in Example 2.

With the same arrangement as in Example 1, when an objective 310 having a numerical aperture of 0.7 is used and each of points of z=3δ, 5δ and 10δ is viewed in an approxi-

TABLE 1

| | Radius after normalization | 0 | 0.3 | 0.4 | 0.5 | 0.6 | 0.7 | 0.8 | 0.9 | 0.99 |
|---|---|---|---|---|---|---|---|---|---|---|
| NA0.5 | Amount of wavefront deformation | 0 | −0.023 | −0.041 | −0.065 | −0.096 | −0.135 | −0.182 | −0.240 | −0.302 |
| | Mirror configuration | 0 | −0.022 | −0.037 | −0.056 | −0.079 | −0.109 | −0.151 | −2.085 | −2.660 |
| NA0.8 | Amount of wavefront deformation | 0 | −0.024 | −0.044 | −0.071 | −0.109 | −0.162 | −0.236 | −0.344 | −0.499 |
| | Mirror configuration | 0 | −0.023 | −0.040 | −0.063 | −0.094 | −0.134 | −0.182 | −0.239 | −0.303 | mately aberration-free state, the amount of deformation of the wavefront at the pupil position 311 of the objective 310 is as shown in Table 3 and FIG. 6.

TABLE 3

| | Radius after normalization | Amount of wavefront deformation | | | | | | | |
|---|---|---|---|---|---|---|---|---|---|
| | | 0 | 0.3 | 0.4 | 0.5 | 0.6 | 0.7 | 0.8 | 0.9 | 0.99 |
| NA0.7 | z = 3δ | 0 | −0.071 | −0.128 | −0.207 | −0.312 | −0.450 | −0.634 | −0.881 | −1.185 |
| | z = 5δ | 0 | −0.115 | −0.212 | −0.344 | −0.519 | −0.749 | −1.055 | −1.468 | −1.974 |
| | z = 10δ | 0 | −0.233 | −0.425 | −0.688 | −1.039 | −1.501 | −2.112 | −2.935 | −3.950 |

The amount of wavefront deformation increases in proportion to the distance from z=0, and the wavefront shape satisfies Conditions 1a and 1b. In this case also, the objective 310 used is an aplanatic lens.

EXAMPLE 3

With the same arrangement as in Example 1, when an objective 310 having a numerical aperture of 0.5 is used and a point of z=10δ is viewed in an approximately aberration-free state, the amount of deformation of the wavefront at the pupil position 311 of the objective 310 is as shown in Table 4, as calculated from Equation 4. The wavefront shape when the mirror is deformed and the position where wavefront aberration of the collected light spot becomes minimum at that time, together with the Strehl ratio of wavefront aberration at the position where wavefront aberration becomes minimum, are shown in Table 4.

TABLE 4

| Radius of wavefront | 0 | 0.3 | 0.5 | 0.7 | 0.9 | Position where light is collected | Strehl ratio |
|---|---|---|---|---|---|---|---|
| Original shape | 0 | −0.23 f(0.3) | −0.66 f(0.5) | −1.35 f(0.7) | −2.40 f(0.9) | 10δ | 1.000 |
| Example of deformation | 0 | −0.24 1.04f(0.3) | −0.68 1.04f(0.5) | −1.40 1.04f(0.7) | −2.49 1.04f(0.9) | 10.4δ | 0.998 |

In Table 4, f(ρ, 0.5) is abbreviated to f(ρ).

Regarding the light collecting performance, the above-described condition that "the Strehl ratio is 0.7 or more" is satisfied. In this case also, the objective 310 used is an aplanatic lens. It should be noted that the ordinate axis in each of the graphs shown in FIGS. 4 to 6 represents the amount of wavefront distortion expressed in units of "wavelength", and the abscissa axis represents the radius after normalization, which has no associated units.

As will be clear from the foregoing description, it is possible according to the present invention to optically perform scanning in the optical axis direction in a laser beam collecting optical system without a need of a mechanical device and to prevent degradation of the light collecting performance by canceling aberration occurring during the scanning. In a laser scanning microscope in particular, a favorable optical slice image, which is free from resolution degradation, can be obtained.

What we claim is:

1. A light collecting optical system comprising:
    a light source;
    an objective for collecting light from said light source; and
    a wavefront converting element placed at one of the following four positions:
    a pupil position of said objective;
    a vicinity of a pupil position of said objective;
    a position conjugate to a pupil position of said objective; and
    a vicinity of a position conjugate to a pupil position of said objective;
    said wavefront converting element changing a wavefront shape formed in an area covering at least 90% of a light beam at the one of said four positions according to the following conditions 1 to 4:
    when a position where the light from said light source is collected by said objective is away from said objective, said wavefront converting element changes the wavefront shape according to the following conditions 1 and 2 :
        condition 1: the amount of change of the wavefront shape decreases monotonously from a center toward a periphery of the pupil;
        condition 2: the wavefront shape is convex toward said objective;
    when a position where the light from said light source is collected by said objective is closer to said objective, said wavefront converting element changes the wavefront shape according to the following conditions 3 and 4:
        condition 3: the amount of change of the wavefront shape increases monotonously from a center toward a periphery of the pupil;
        condition 4: the wavefront shape is concave toward said objective.

2. A light collecting optical system according to claim 1, wherein a wavefront shape g(x, y, z, na) at or near the pupil position of said objective satisfies the following Condition 1a or 1b:
    when $g_1(x, y, z, na) = g_0(x, y, 10\delta, na)z/10\delta$, for (x, y) that satisfies $x^2+y^2 \geq 0.3$ and z that satisfies $3\delta < z < 50\delta$, $$1.2g_1(x, y, z, na) < g(x, y, z, na) < 0.8g_1(x, y, z, na) \quad \text{(Condition 1a)}$$

for (x, y) that satisfies $x^2+y^2 \geq 0.3$ and z that satisfies $-50\delta < z < -3\delta$, $$0.8g_1(x, y, z, na) < g(x, y, z, na) < 1.2g_1(x, y, z, na) \quad \text{(Condition 1b)}$$

where:
- g(X, y, z, na): a wavefront shape (units: wavelength) formed at a pupil plane of the objective by the wavefront converting element, wherein g(0, 0, z, na)≡0;
- $g_0$(x, y, z, na): a wavefront shape (units: wavelength) formed at the pupil plane of the objective by light from a point light source at a position z on the optical axis after passing through the objective, wherein $g_0$(0, 0, z, na)≡0;
- x, y: a position in the pupil plane of the objective, wherein a position on the optical axis is expressed by (x, y)=(0, 0), and $x^2+y^2 \leq 1$ holds because normalization is performed by using a pupil radius of the objective;
- z: a position on the optical axis, wherein a position where wavefront aberration becomes minimum is z=0 with regard to a collected light spot formed on a specimen side of the objective when a plane wave enters the objective from an image side thereof, and a direction in which light travels from the light source toward a specimen is defined as a positive direction;
- na: (=NA/n) a value obtained by dividing a specimen-side numerical aperture of the objective by a refractive index n of a medium between said objective and the specimen (0.1<na<0.95);

wherein the pupil position of said objective is a back focal position when the specimen side is defined as a front side; and wherein $\delta = n\lambda/2NA^2$ where:
- δ: a depth of focus;
- n: a refractive index of a medium between said objective and the specimen;
- λ: a working wavelength;
- NA: a specimen-side numerical aperture of said objective.

3. A light collecting optical system according to claim 1, wherein a wavefront shape g(x, y, z, na) at or near the pupil position of said objective satisfies the following Condition 2a or 2b:

when, for −3δ<z<3δ, $$g_1(x, y, z, na) = \{g_0(x, y, \delta, na) - g_0(x, y, 0, na)\}z/\delta + g_0(x, y, 0, na)$$

when $g_1$(x, y, z, na)≧0, $$0.8g_1(x, y, z, na) < g(x, y, z, na) < 1.2g_1(x, y, z, na) \quad \text{(Condition 2a)}$$

when $g_1$(x, y, z, na)≦0, $$1.2g_1(x, y, z, na) < g(x, y, z, na) < 0.8g_1(x, y, z, na) \quad \text{(Condition 2b)}$$

where:
- g(x, y, z, na): a wavefront shape (units: wavelength) formed at a pupil plane of the objective by the wavefront converting element, wherein g(0, 0, z, na)≡0;
- $g_0$(x, y, z, na): a wavefront shape (units: wavelength) formed at the pupil plane of the objective by light from a point light source at a position z on the optical axis after passing through the objective, wherein $g_0$(0, 0, z, na)≡0;
- x, y: a position in the pupil plane of the objective, wherein a position on the optical axis is expressed by (x, y)=(0, 0) and $x^2+y^2 \geq 1$ holds because normalization is performed by using a pupil radius of the objective;
- z: a position on the optical axis, wherein a position where wavefront aberration becomes minimum is z=0 with regard to a collected light spot formed on a specimen side of the objective when a plane wave enters the objective from an image side thereof, and a direction in which light travels from the light source toward a specimen is defined as a positive direction;
- na: (=NA/n) a value obtained by dividing a specimen-side numerical aperture of the objective by a refractive index n of a medium between said objective and the specimen (0.1<na<0.95);

wherein the pupil position of said objective is a back focal position when the specimen side is defined as a front side; and wherein $\delta = n\lambda/2NA^2$ where:
- δ: a depth of focus;
- n: a refractive index of a medium between said objective and the specimen;
- λ: a working wavelength;
- NA: a specimen-side numerical aperture of said objective.

4. A light collecting optical system according to claim 1, wherein said light source is a laser light source.

5. A light collecting optical system according to claim 4, further comprising:
a conversion optical system for converting a diameter of a laser beam emitted from said laser light source.

* * * * *